Patented Mar. 17, 1931

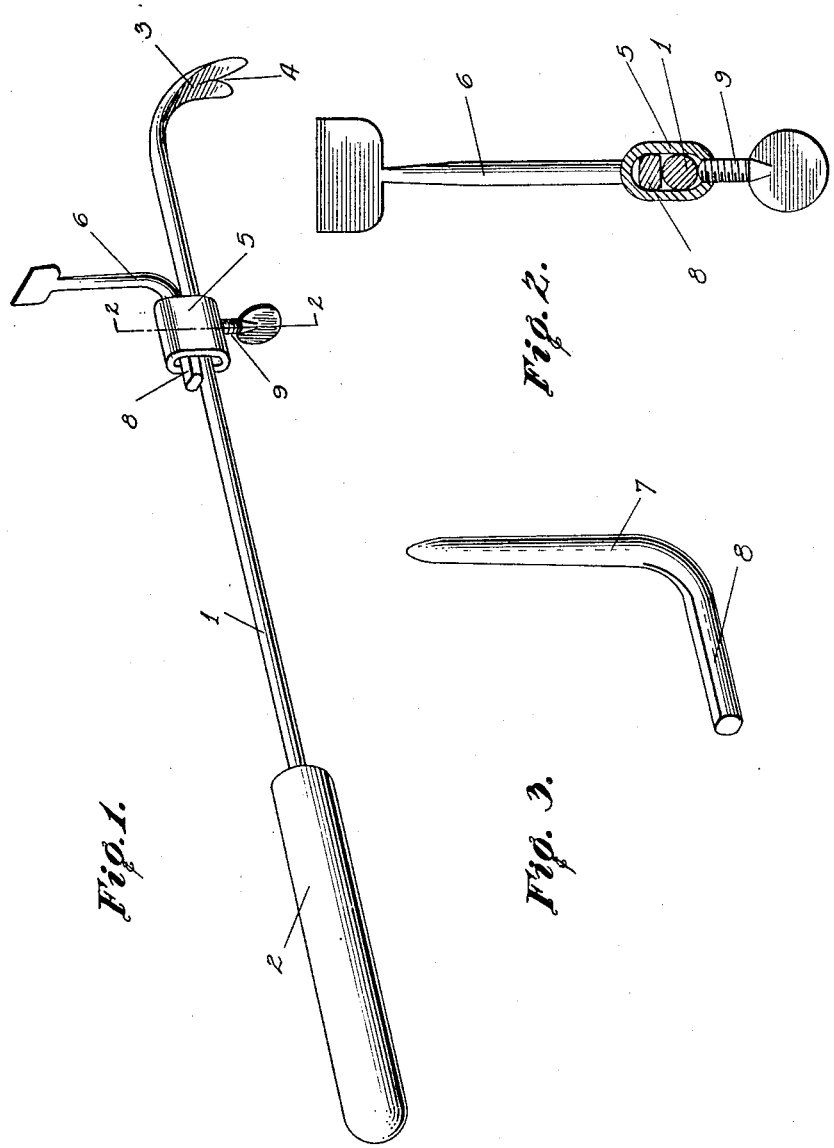

1,797,101

UNITED STATES PATENT OFFICE

JOSEPH R. RAY, OF EL PASO, TEXAS, ASSIGNOR TO JAMES EFTON BEAVIN AND FREDERICK S. BRYARS, BOTH OF EL PASO, TEXAS

GARDEN TOOL

Application filed December 14, 1928. Serial No. 325,966.

This invention relates to a tool, the general object of the invention being to provide a small device for cultivating and weeding plants in hot beds, hot houses, flower beds, boxes and other places where the plants are placed so close together that an ordinary hoe could not be used.

Another object of the invention is to provide the tool with means whereby other tools may be detachably connected therewith.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a perspective view of the device.

Figure 2 is a section on line 2—2 of Figure 1.

Figure 3 is a view of a pick device which may be used instead of the hoe shown in Figures 1 and 2.

In these views, the numeral 1 indicates a stem having a handle 2 attached to one end thereof, with its other end curved and flattened, as shown at 3, the extremity of the flattened part being formed with a V-shaped recess 4 so as to provide a pair of prongs on the flattened part, the edges of which are beveled to provide cutting edges. Thus the device can be used for removing weeds and cultivating the soil in flower beds and other places where plants are placed so close together that it is impossible to use an ordinary hoe or similar device.

An oblong collar 5 is adapted to be slipped over the cutting part of the tool on to the stem 1 thereof so that either a small hoe 6 or a pick 7 can be attached to the stem, as shown in Figure 1. Both the hoe 6 and the pick 7 are formed with a shank of rightangle form, with one part of the shank flattened on two sides, as shown at 8, so that when this flattened part is placed in the collar and the set screw 9 which passes through a threaded hole in the collar is tightened, the auxiliary implement will be clamped to the stem 1. The auxiliary implement should extend in an opposite direction from the cutting part 3 of the main tool, as shown in Figure 1, so that this auxiliary tool can be used without the part 3 of the main tool injuring the plants. Of course, other auxiliary tools besides the hoe and pick can be used, if desired.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A tool of the class described comprising two blade units, one of said units comprising a handle member, a stem extending therefrom and provided with a curved outer end portion terminating in a soil treating element, the other unit comprising a stem carrying, at one end, another soil treating element, the last mentioned stem being bent to provide an angularly extending shank portion, the said portion being of squared form in cross section and disposed against the stem of the handle member with its first mentioned portion and soil treating element extending in a direction the opposite to that of the curved outer end of the said stem of the handle member, and means for connecting the units in assembled relation to each other, the said means comprising a collar fitting the assembled stem portions of the two members and including straight sides and arcuate connecting end portions, one of the said arcuate end portions embracing the outer side of the stem of the handle member and the other arcuate portion embracing the side of the shank portion of the second mentioned stem, at the edges thereof, whereby to hold the shank portion against turning, and a set screw threaded through the first mentioned arcuate end portion of the collar, and adjustable to bind against the stem of the first mentioned member.

In testimony whereof I affix my signature.

JOSEPH R. RAY.